Jan. 17, 1950     R. C. DAVIS     2,495,160
CONTROL APPARATUS
Original Filed April 3, 1941
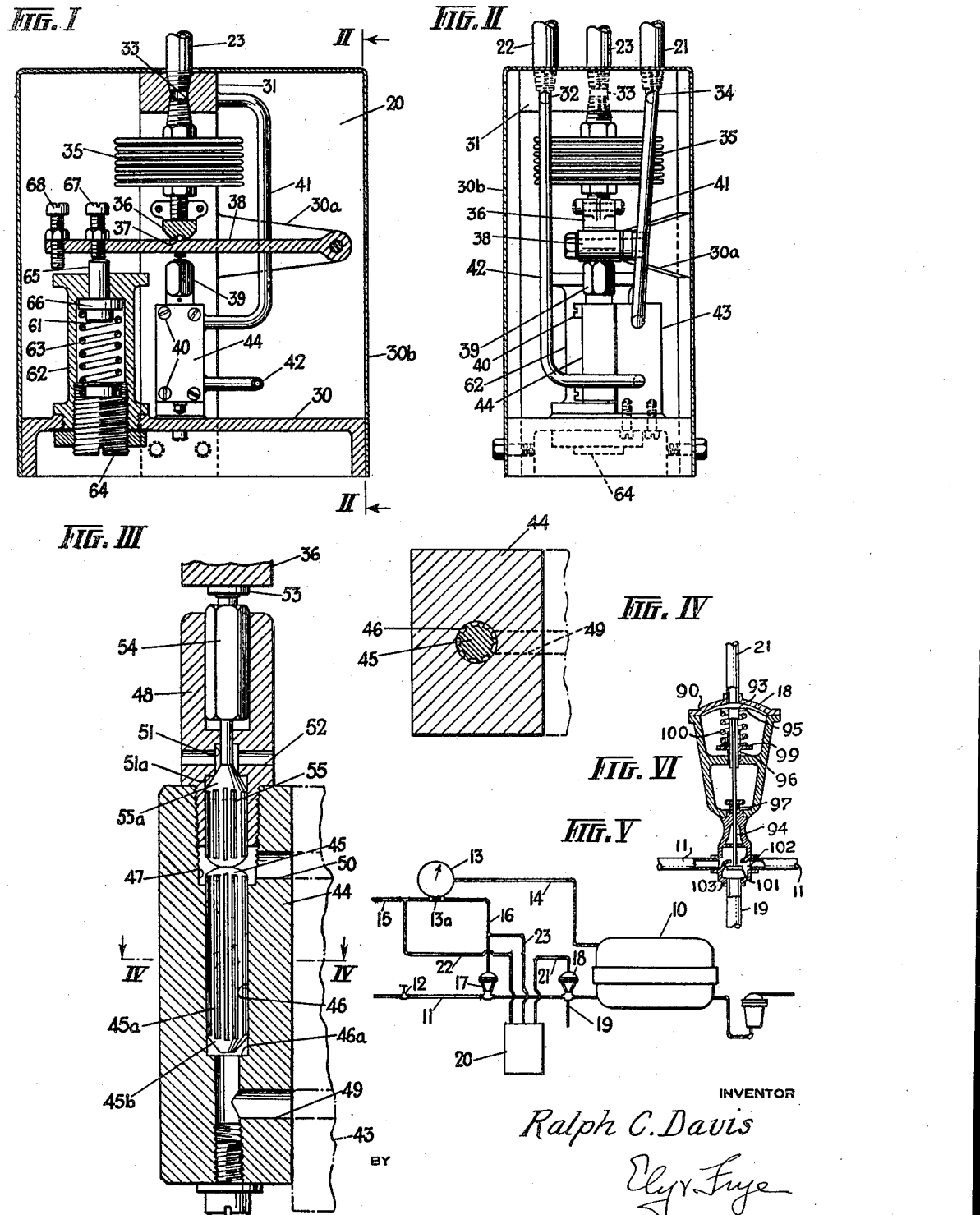
INVENTOR
Ralph C. Davis
BY
ATTORNEYS

UNITED STATES PATENT OFFICE 2,495,160

CONTROL APPARATUS

Ralph C. Davis, Akron, Ohio, assignor to The Firestone Tire & Rubber Company, Akron, Ohio, a corporation of Ohio Original application April 3, 1941, Serial No. 386,692, now Patent No. 2,354,429, dated July 25, 1944. Divided and this application March 15, 1944, Serial No. 526,839

2 Claims. (Cl. 137—153)

This invention relates to control apparatus, and has especial relation to pressure operated control devices adapted, in turn, to operate pressure operable means and regulate the conditions to which a given apparatus is subjected. This application is a division of my copending application Serial No. 386,692, filed April 3, 1941, now Patent No. 2,354,429 granted July 25, 1944.

One example of use of control devices of the nature covered by the present invention is in the vulcanization of pneumatic tires in jacket molds. During vulcanization, it is usually desirable to vary the pressure and temperature within the mold, first by progressively increasing same in several steps, holding the maximum temperature and pressure obtained for a given interval, and then reducing the temperature and pressure within the mold in several steps. With the usual type of controller devices, it has been difficult to effect an accurate, rapid control, in reducing the temperature of the mold in the last stages of vulcanization.

The general object of the present invention is to provide an improved control device adapted to facilitate controlling the temperature or pressure of a given apparatus to the desired value.

A further object of the invention is to provide a simple, inexpensive, adjustable control device which is sturdily constructed and adapted to give a maximum of service with a minimum of maintenance thereon.

The foregoing and other objects will be manifest as the specification proceeds, which specification is described with reference to the accompanying drawings, in which:

Fig. I is a vertical section of a control device embodying the invention;

Fig. II is a section taken on line II—II of Fig. I;

Fig. III is an enlarged vertical section taken through the valve of the control of Fig. I;

Fig. IV is a section taken on line IV—IV of Fig. III;

Fig. V is a diagrammatic view of apparatus embodying the invention and for practice of the method of the invention; and Fig. VI is an enlarged view showing the mechanism of valve 18 of Fig. V.

The general aspect of the present invention is best illustrated by Fig. V, and this includes the apparatus or article to be controlled in accordance with the invention, in this instance, a jacket mold 10. Steam or other heating fluid is introduced into the mold 10 through a pipe 11 having a shutoff valve 12 therein, which pipe 11 connects to any suitable source (not shown) of steam under pressure. A temperature or pressure control and/or indicator 13 of standard construction is provided and is connected to the mold 10 by a pipe or other means 14, whereby the temperature of the mold 10 is accurately recorded on the indicator 13. A pipe 15 connects to the indicator 13 and is connected to a suitable constant pressure source (not shown) which, in this case, was 20 pounds per square inch of air pressure. Thus, the temperature indicator 13 is constructed and arranged so that its operation is controlled by the temperature of the mold 10 in relation to that desired in the mold, at that given time. The indicator 13 opens or closes a valve 13a associated therewith whereby the air pressure in pipe 16 leading from the temperature indicator 13 can be varied from zero to 20 pounds, dependent upon the position of the valve 13a. A mechanism which is satisfactory for operation of 13a is shown in Fig. 3, of the Karl H. Hubbard Patent No. 2,076,641. The pipe 16, in turn, connects to a pressure controlled valve 17 that is in the steam line 11, whereby the valve 17 is opened or closed, dependent on whether there is a low or a high pressure, respectively, in the line 16, so that steam is permitted to flow through, or is prevented from flowing through the line 11 to the vulcanizer 10.

In order to reduce the temperature of the mold 10 rapidly, when desired, a three-way valve 18 is also connected in the steam line 11 between the valve 17 and the mold. This valve 18 connects to a pipe 19 that leads to a sewer, or other exhaust means. The valve 18 is constructed and arranged so that it either permits flow of steam through the line 11 to the mold 10, or else permits flow of steam from the mold 10 to the exhaust pipe 19. The positioning or operation of the valve 18 is controlled through a controller unit generally indicated 20, which connects to the valve 18 by a pipe 21. The controller unit 20 is connected to the 20 pound air supply pipe 15 by a pipe 22, while the controller also has a variable supply of air pressure connected thereto through a pipe 23, which pipe connects to the pipe 16, whereby the pressure in the pipe 23 is dependent upon the conditions existing in the mold 10 in relation to those predetermined conditions set up as desired in the mold at that point in the vulcanization cycle. The controller unit 20, as will hereinafter be pointed out in detail, is designed so that the variable pressure in the line 23 opens the valve 18 and connects the mold 10 to the exhaust line 19 when the temperature in the mold is above that predetermined value desired at that instant. At other points in the vulcanization cycle when the mold is at substantially the temperature desired, or when it is below the desired temperature, then the controller 20 maintains the valve 18 in such a manner that steam readily passes therethrough to the mold 10 in order to raise its temperature. Hence, by provision of the controller 20 a rapid, automatic means for lowering the temperature of the mold 10 when the temperature thereof is stepped down sharply, or at any other desired time, is provided by the controller 20.

Figs. I through IV show the specific construction of the controller device 20, which includes a frame 30 which has an apertured block 31 at the upper portion thereof, to which block 31 the pipes 21, 22, and 23 connect to supply the compressed air to the controller in order to operate same. The device 20 includes a cover 30b. The block 31 has apertures 32, 33 and 34 formed therein with the variable pressure control pipe 23 connected to the aperture 33 and pipes 22 and 21 to apertures 32 and 34, respectively. A bellows 35 is connected to the aperture 33 and receives air from the line 23. The bellows 35 is of any standard construction and exerts an appreciably larger force at its free end than the force of pressure exerted on the bellows by the fluid from the line 23. A split block, or other suitable pressure transmitting member 36 is carried by the free end of the bellows while a ball bearing 37 which contacts a lever 38 that is pivotally mounted at one end on a bracket 30a formed on the frame 30, is mounted on the lower portion of the split block. The ball bearing 37 facilitates sliding movement of the block on the lever 38. The lever 38 is mounted to have pivotal movement in a given plane and is in operative relationship with a valve, indicated generally at 39, which is positioned on the frame 30. The valve 39 is connected to the block 31 and thereby to the pipes 21 and 22 by means of tubes 41 and 42, respectively, which connect to a manifold 43 that is secured to the valve 39 by screws 40.

The valve includes a valve body 44 in which a movable plunger 45, having longitudinally extending ribs 45a on its outer surface, is received. The valve body 44 has an axially extending bore 46 formed therein which has a shoulder 46a formed therein. One end of the bore 46 is enlarged at 47 and is provided with a threaded surface to engage with a supplemental valve housing 48. Conduits 50 and 49 in the valve body connect the bore 46 to the tubes 41 and 42, respectively. The valve housing 48 has an axially directed bore 51 formed therein and a shoulder 51a is formed in this bore adjacent the valve body 44. Exhaust openings 52 extend from the bore 51 to the periphery of the valve housing 48. The valve 39 is completed by an outer valve plunger 53 which is secured to, or integral with a member 54 which is snugly received within the bore 51. This outer valve plunger connects to the inner valve plunger 45 by means of an auxiliary plunger 55, which also has a corrugated or ribbed outer periphery, and which is on the opposite side of the shoulder 51a from the member 54. In some cases, it may be desirable to form plungers 45 and 55 as a unit, although in the construction shown the plungers are separate but in contact at all times in the valve's operation. Conically shaped seating surfaces 45b and 55a are formed on the spaced ends of the plungers 45 and 55, respectively, and are adapted to be seated upon the shoulders 46a and 51a, respectively, in order to form seals in the bores 46 or 51, when desired.

Fig. III shows that, normally, the fluid pressure led to conduit 49 by the tube 42 forces the plungers 45 and 55 to their outermost positions with respect to the valve 39 and, when in such position, the valve plunger 55 is seated on the shoulder 51a, whereby the conduit is formed through the valve from the inlet conduit 49 to the outlet conduit 50, which, in turn, enables air supplied to the controller 20 through the pipe 22 to pass therefrom through the pipe 21 and maintain the valve 18 in its normal position where it is open to line 11 to permit passage of steam. However, when the valve plungers 45 and 55 are moved to their innermost positions with relation to the valve, then the surface 45b seats upon the shoulder 46a and seals the conduits 49 and 50 from each other. This enables gas or fluid under pressure in the pipe 21 to escape from the valve through the escape ports 52, thereby changing the position of the valve 18 to shut off flow of steam to the mold and permitting exhaust of gas or steam from the mold 10 to the sewer pipe 19.

To prevent undesired or improper movement of the valve plunger 53, yieldable variable pressure means 61 are associated with the lever 38 in the same manner as the plunger 53 with relation to the force exerted on the lever 38 through the bellows 35. That is, the pressures set up by the pressure member 61 and the plunger 53 are in opposed relation to the pressure exerted on the lever 38 by the bellows 35. The pressure member 61 may include a housing 62 that is carried on the frame 30 with a spring 63 being received in and axially compressed any desired degree in the housing by a threaded set screw 64 which engages with a threaded end of the housing. A pin 65 extends from the housing 62 with the pin having a head 66 that bears upon the inner surface of the housing. The pin 65 is maintained in a position extending from the housing by the spring 63. The pin 65 normally engages with a set screw 67 carried by the lever 38, whereby a yieldable pressure is set up on the lever 38. A motion limiting set screw 68 is also engaged with the lever 38 and is adapted to bear upon one end of the housing 62 and limit movement of the lever 38 toward the housing whereby the forced movement of the plunger 53 is also limited.

In operation, as pointed out above, it will be seen that the variable pressure set up upon the bellows 35 can be used to change the position of the valve 39 and the desired temperature and/or pressure conditions on the controlled apparatus can be established. For example, a predetermined pressure can be established at which the valve 39 is to operate. Then the set screw 64 is adjusted to set up such pressure upon the pin 65, whereby normal pressure upon the bellows 35 is not sufficient to force the lever 38 downwardly and change the position of the valve 39. However, when sufficient pressure is set up in the pipe 23, as when the temperature in the mold 10 is too high, then the bellows will force the lever to move downwardly and will then move the plungers 45 and 55 of the valve to their lower seating position and break the passage formed between the inlet and outlet conduits 49 and 50 and form a passage between the outlet conduit 50 and the exhaust conduit 52, whereby the position of the valve 18 is changed, steam exhausted from the mold 10, and the desired temperature set up in the mold. Then, the pressure on the bellows 35 is reduced and the combined actions of the pressure exerted on the bellows 35 by the valve 39, through the plunger 53, and the compression of the spring 63 force the lever 38 to its uppermost position, whereby the setting of the valve 18 is changed and steam can be introduced into the mold to maintain its temperature at the predetermined level.

The detailed description of the particular embodiment of the invention illustrated and described herein is not to be construed as limiting the invention thereto. The invention includes all features of patentable novelty residing in the foregoing description and the accompanying drawings.

What is claimed is:

1. A control device adapted to be used in conjunction with an installed control whereby the performance of said installed control is affected, said device comprising a frame, a bellows carried by said frame and designed to have a variable pressure exerted thereon, a lever pivotally mounted upon said frame, means carried by said bellows and bearing on said lever, a valve having inlet, exhaust and outlet openings therein positioned upon said frame adjacent said lever, said valve including a movable element extending therefrom adjacent said lever and contacting same in opposed relation to said member, the position of said movable element determining whether said outlet opening connects to said inlet or exhaust opening, and yieldable adjustable pressure means associated with said lever in opposed relation to the first said means to limit the normal position of said lever with relation to said movable element, said valve inlet being adapted to have a fluid under constant pressure supplied thereto to retain said movable element normally in connecting relation between said inlet and outlet openings, but said bellows being adapted to exert sufficient pressure upon said lever under predetermined pressure conditions in the bellows, to change the position of said lever, move said movable element, and connect said outlet and exhaust openings.

2. In a device for operating control apparatus, a frame, a bellows carried by said frame and adapted to receive a variable pressure, a lever pivotally mounted upon said frame, said bellows being operatively associated with said lever, a valve having inlet, exhaust and outlet openings therein positioned upon said frame adjacent said lever, said valve including a movable element extending therefrom adjacent said lever and contacting same in opposed relation to said bellows, the position of said movable element determining whether said outlet opening connects to said inlet or exhaust opening, and pressure means associated with said lever in opposed relation to said bellows to limit the normal position of said lever with relation to said movable element, said bellows being adapted to exert sufficient pressure upon said lever to change the position of said lever and move said movable element under predetermined pressure conditions in the bellows.

RALPH C. DAVIS.

REFERENCES CITED

The following references are of record in the file of this patent:

UNITED STATES PATENTS

| Number | Name | Date |
|---|---|---|
| Re. 17,558 | Hauxhurst | Jan. 7, 1930 |
| 681,172 | Koenig | Aug. 20, 1901 |
| 809,590 | Watson | Jan. 9, 1906 |
| 1,017,178 | Selin | Feb. 13, 1912 |
| 1,358,193 | Fulton | Nov. 9, 1920 |
| 1,480,126 | Sullivan | Jan. 8, 1924 |
| 1,618,815 | Cory | Feb. 22, 1927 |
| 1,658,382 | Kimball | Feb. 7, 1928 |
| 2,099,244 | Temple | Nov. 16, 1937 |
| 2,165,518 | Stolz | July 11, 1939 |
| 2,232,219 | Dueringer | Feb. 18, 1941 |
| 2,256,165 | Mastenbrook | Sept. 16, 1941 |